US008639772B2

(12) United States Patent
Gentile et al.

(10) Patent No.: US 8,639,772 B2
(45) Date of Patent: Jan. 28, 2014

(54) CENTRALIZED APPLICATION RESOURCE MANAGER

(75) Inventors: Christopher Thomas Gentile, Pennington, NJ (US); Adam Nemitoff, Glen Rock, NJ (US)

(73) Assignee: Iboard Incorporated, Pennington, NJ (US)

( * ) Notice: Subject to any disclaimer, the term of this patent is extended or adjusted under 35 U.S.C. 154(b) by 444 days.

(21) Appl. No.: 12/706,545

(22) Filed: Feb. 16, 2010

(65) Prior Publication Data
US 2011/0202656 A1    Aug. 18, 2011

(51) Int. Cl.
*G06F 15/16* (2006.01)
(52) U.S. Cl.
USPC .......................................... 709/217
(58) Field of Classification Search
USPC .................................. 709/223–229
See application file for complete search history.

(56) References Cited

U.S. PATENT DOCUMENTS

| 2002/0105924 | A1* | 8/2002 | Yang et al. ............. 370/329 |
| 2005/0114887 | A1* | 5/2005 | Gelissen ............... 725/47 |
| 2005/0260989 | A1* | 11/2005 | Pourtier et al. ......... 455/435.3 |
| 2008/0168125 | A1* | 7/2008 | Chen et al. .............. 709/202 |
| 2008/0294972 | A1* | 11/2008 | Hjelte .................. 715/201 |
| 2009/0006695 | A1* | 1/2009 | Bushell et al. .......... 710/262 |
| 2009/0164607 | A1* | 6/2009 | Clark et al. ............. 709/219 |
| 2009/0249222 | A1* | 10/2009 | Schmidt et al. ......... 715/751 |
| 2010/0043005 | A1* | 2/2010 | Ahuja et al. ............ 718/104 |
| 2011/0238786 | A1* | 9/2011 | Fontaine ............... 709/217 |

* cited by examiner

*Primary Examiner* — Shirley Zhang
(74) *Attorney, Agent, or Firm* — Davidson, Davidson & Kappel, LLC.

(57) ABSTRACT

An application resource manager is provided to organize, prioritize, and optimize data transmissions from several connected applications. Through inter-process communication, the several connected applications may pass all transmission requests to the centralized manager, which will perform all transmissions according to priority. When the transmission includes a download (e.g., file, email, etc.), the manager will pass the complete file (or a pointer to the same) to the originally requesting application. The original application may perform post-processing and then use the downloaded data, including making the data available to the user. If however, the requesting application is offline, the manager may also perform, e.g., the essential post-processing, via a plug-in given to the manager by the application when the application initially connected to the manager. A full sized user interface and a smaller user interface may be provided for un-intrusive execution.

20 Claims, 8 Drawing Sheets

CENTRALIZED APPLICATION RESOURCE MANAGER

BACKGROUND

Evolving from computer systems capable of running only one application at a time, more and more multi-tasking operations are being built into modern devices. Operating systems are facilitating multiple applications executing at the same time, and applications are facilitating multiple threads during execution. Hardware systems are keeping pace with multi-processor systems, multi-core processors, and systems that simulate multi-core processors. Additionally, modern software and usage models have evolved from a local computer, to a local computer connected to a network, to distributed computing. Modern systems are becoming more dependent on the Internet to facilitate current usage patterns. With an expanding number of concurrently executing applications, each requiring use of an external communication network for various functions, significant strain is being placed on the fixed network connection of an individual device. This is true for relatively fast connections, such as high-speed consumer connections (e.g., DSL), and even more so for relatively slow connections, such as cellular Internet connections.

Some attempts at mitigating the effects of these bottlenecks have been implemented. Operating Systems will play a natural role in trying to facilitate multiple data transfers. Additionally, some "download managers" exist, which try to organize and optimize multiple downloads within one application, or even among several applications. However, these applications have serious limitations in both breadth of functionality, and depth of effectiveness, which example embodiments of the present application overcome with the novel features described herein.

SUMMARY

Example embodiments of the present invention may include systems and methods for providing a central application manager. An example embodiment may include a computer implemented method for managing computer applications. The example method may receive, from a first computer application a first download request, the first download request being based on user input received by the first computer application. The example method may receive from a second computer application a second download request. The second download request may be based on user input received by the second computer application. Also, the first and the second computer applications may be independent of each other. The example method may prioritize the first download request and the second download request, according to at least user priority input. The example method may download data associated with the download requests, according to the prioritization. Also, upon completion of a data download, the example method may pass information regarding the downloaded data to whichever application passed the associated request to the application manager. Finally, upon completion of a data download, the example method may remove the completed download from the prioritization queue, and for all remaining data download requests, the example method may continue downloading data associated with the remaining data download requests, according to the prioritization.

Further, in an example embodiment of the present invention, the functions of receiving and passing may be performed between the application manager and at least a third application and third download request. The prioritization may be based upon input received by the application manager, from a user. The example method may record performance metrics of the application manager. The application manager may also be configured to receive application updates from an update server, and the application manager may be configured to pass the updates along to whichever application of a plurality of applications indicated by a particular update. Additionally, individual connected applications may pass along a request for an update, and the application manager may download and pass back the update.

In another example embodiment of the present invention, the application manager may receive a plug-in from some or all of the applications under management. This plug-in may perform a sub-set of functions provided by the individual applications, and the application manager may perform those functions upon completion of a data transfer. Alternatively, the application manager may pass the completed data to the requesting application to perform the functions, and only perform them at the manager level when the application is offline.

Additionally, example embodiments of the present invention may include components for providing a user interface. Further, a second, sub-set interface may be provided with a sub-set of functions. This sub-set interface may provide any number of features, including "pause all" functions for pausing data transmissions. The sub-set interface may also notify the user of new messages received and file transmission status.

DETAILED DESCRIPTION OF EXAMPLE EMBODIMENTS

Example embodiments of the present invention relate to an application resource manager for coordinating and optimizing a plurality of applications. In this example embodiment, each of the applications is based on an application framework. Each individual application may perform individual functions without the assistance of the application resource manager. However, the individual applications may interface with the application resource manager for various tasks, including resource limited tasks, such as message and/or data transfers with an external network.

The application resource manager may include a number of features designed to optimize the individual managed applications. First, many of the individual applications may require concurrent use of the limited bandwidth of the network connection of the system. Further, the several different needs for bandwidth may have a range of priorities, and may need to be organized accordingly. Additionally, the application resource manager may provide a central notification and control center. The application resource manager may further provide a subset of manager functions in a smaller, "slide-out" application display. Additionally, each independent managed application may require some form of post-download processing. For example, an mp3 e-commerce site may need to watermark each mp3 for origin determinations. Some or all of this post-download processing may be performed by the application resource manager, instead of the individual application itself, which generally performs all of the application specific processing. The application resource manager may prioritize and organize an efficient use of processing resources, visual display resources, or any other limited resource shared among the several individual applications.

Figure 1:
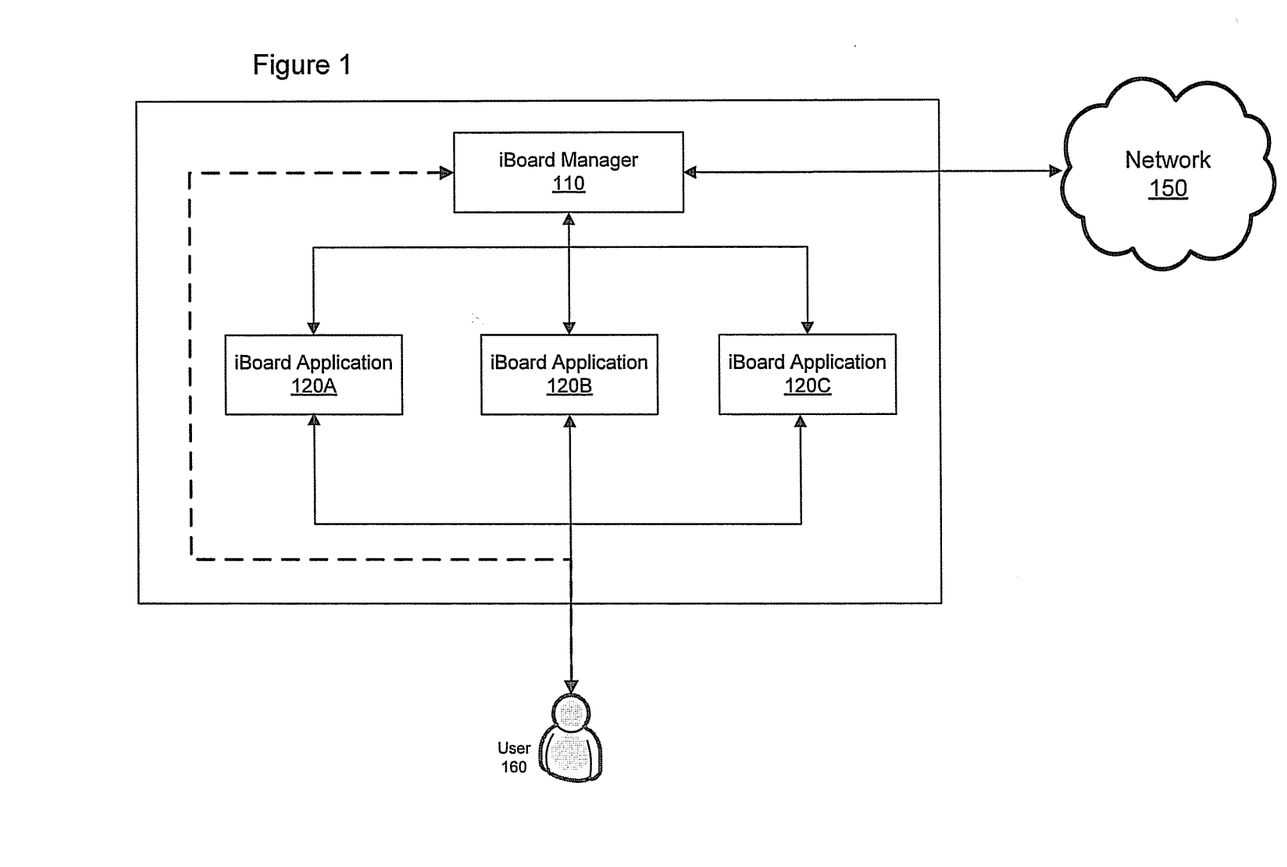
FIG. 1 depicts a block diagram of how the different software modules relate to each other, according to an example embodiment of the present invention.

FIG. 1 illustrates one example of the relationships and structure of an example embodiment. The application resource manager 110 is connected to three independent applications. In one example embodiment, the applications are built on an iBoard™ framework. These individual applications (e.g., 120A to 120C) are accessed by the user 160. These individual applications may include any number of software applications, e.g., an mp3 player/downloader, a video streaming service, a game, a utility, etc. The applications 120 may be the primary interface for the user, but the user may also directly access the application resource manager 110. The application resource manager may be connected to the network I/O of the system, and facilitate communication with an outside network 150 (e.g., the Internet). The application resource manager may interface with the graphic display unit 160 and processor 170 to facilitate optimizing these shared resources among the several applications. With respect to the network I/O, each individual application 120 may have to send and receive all outside communication via the application resource manager, and may have no direct access to the network 150. The application resource manager and individual applications may run on a general or specific purpose computer or distributed system configured with any software or hardware. These types of computer systems, along with the variations of hardware and software used in them, are well known in the art, and any configuration suitable for the inventive aspects of this disclosure may be used.

Figure 2:
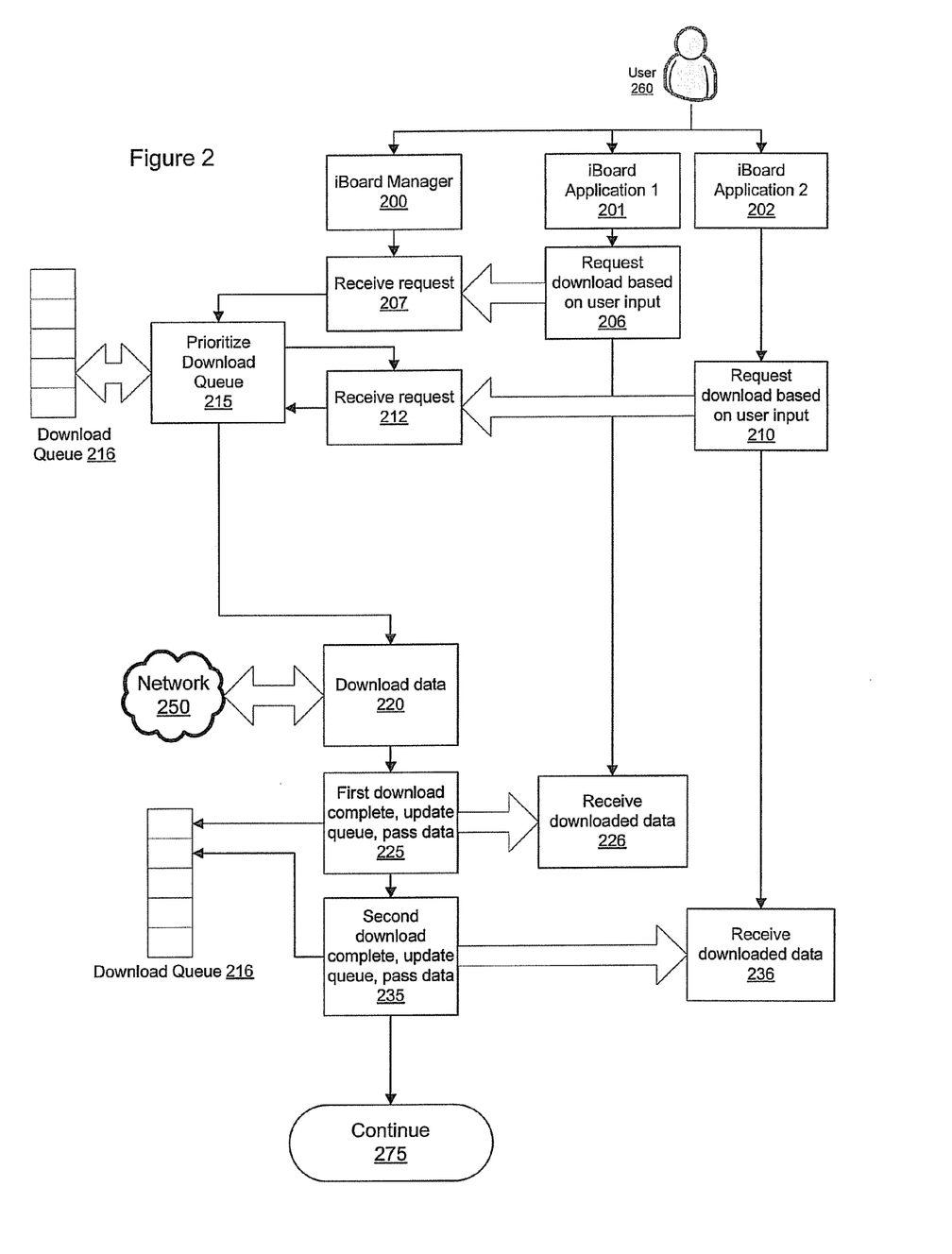
FIG. 2 depicts an example download queue prioritization procedure, according to an example embodiment of the present invention.

One example embodiment of the present invention includes the download prioritization procedure outlined in FIG. 2. Here, the concurrent execution of an example application resource manager 200 and two example individual applications 201/202 are illustrated. First, application 201 may receive user input from user 260 requesting data from the external network 250, e.g., a download. At 206, application 201 may send this request to the application resource manager, which may receive the request at 207. After each incoming request, the download may be placed in a queue and organized according to priority, e.g., at 215. Next, at 210, a second application 202 may request data from the external network 250, e.g. a download, based on user input. This request may be passed to the application resource manager and received at 212. Again, the request is placed in the download queue according to priority at 215. Once at least one data request has been queued, the example procedure may begin downloading data at 220, from the external network 250. The example procedure continues downloading data until a request is complete. For example, at 225, the first download may have finished. The example method will pass that download (or a pointer to the download) to the requesting application at 226. The application resource manager also updates the download queue 216 to remove the associated entry. At 235, the second download request may finish, be passed to the requesting application at 236, and be removed from the download queue. At 275, the example procedure may repeat until terminated.

The example procedure of FIG. 2 is shown with a concurrent, but linear progression. This figure is for illustrative purposes, and it will be appreciated that a multi-threaded concurrent implementation would be an advantageous embodiment. For example, a first thread of the application resource manager application may continuously be listening for incoming requests from associated individual applications (e.g., download requests). When at least one request is present in the queue, the application resource manager may continuously download data according to the queue priority, while the first thread is concurrently listening and/or receiving additional download requests. Further, the downloading process for other requests does not need to be halted when a request completes, but may concurrently continue while the download is passed off to the post-processor or requesting application (e.g., 201 or 202). Multi-threaded concurrent execution is well known in the art and may be implemented in any number of ways. Examples may include, multi-processor systems, multi-core processors, simulated concurrence with time interrupt processing, etc. Example embodiments may include a number of other operations that may require concurrent execution, e.g., as discussed with regard to FIG. 4.

Figure 3:
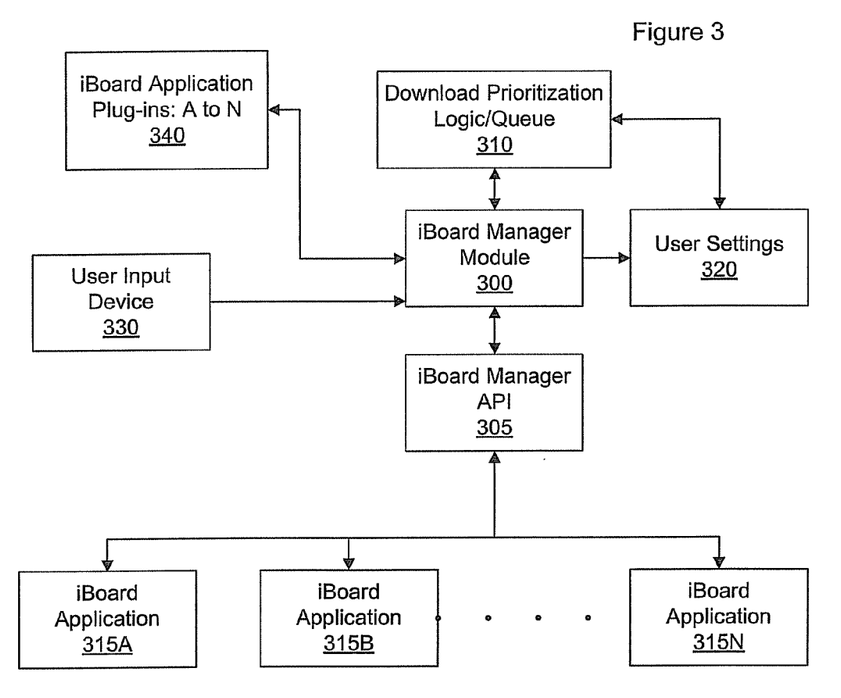
FIG. 3 depicts a block diagram of an example device, according to an example embodiment of the present invention.

FIG. 3 illustrates an example embodiment of an example device configured to perform the application resource manager functions. This example device includes one or more user input devices 330. The example device includes one or more user output devices 335. Other conventional device peripherals may also be connected to the central application manager module 300, to facilitate the inventive aspects of the example device. For example, a device memory may be included where user settings 320 are stored based on user input from device(s) 330.

The memory may also store the active or stored download queue, and the prioritization logic 310. The prioritization logic may incorporate a number of techniques to optimize bandwidth performance and user preferences. In the example embodiment illustrated in FIG. 3, the example device may store user preferences in the user settings 320, related to the priorities of the user. For example, a user may specify that the background downloads from a video rental service have a certain priority over the background downloads of an mp3 market service. Additional prioritizations may be based on conventional priority schemes (e.g., real-time data prioritized over asynchronous data), or conventional priority structures (e.g., FIFO). Additionally, the prioritized queue may be established or modified based in part on direct or indirect user input. For example, a user of a file download application may be provided the option of "add to queue" and additionally provided the option of "add to top of queue." In this case, the individual application will not only pass the download request to the application manager, but also (or as part of the request,) pass a message indicating a user preference for top priority. Priority may also be adjusted by direct user input at the application resource manager user interface. Different example embodiments may implement different prioritization schemes using a mixture of user preferences and conventional optimization schemes.

Figure 8A:
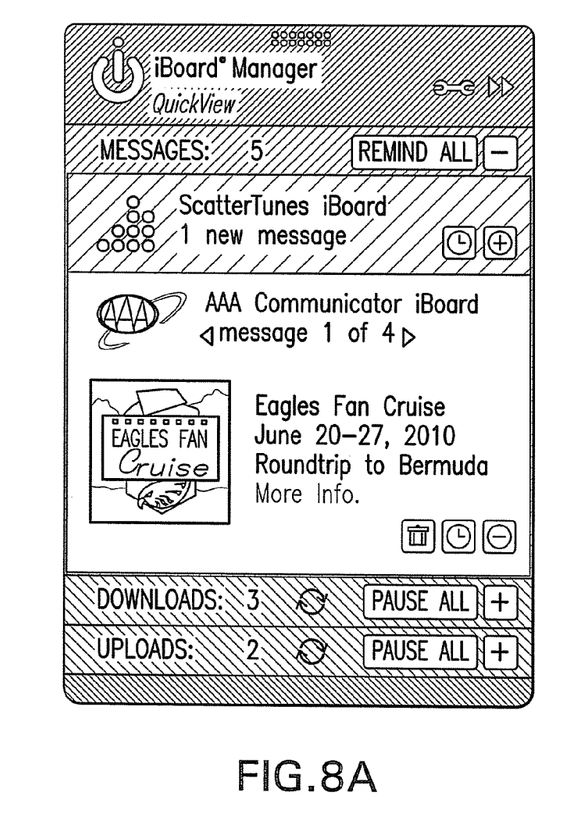
FIGS. 8A and 8B depict example graphical layouts of a sub-set user interface, according to example embodiments of the present invention.

The memory may also store the active or stored message queue. Each individual application 315 may generate a number of system messages and user messages, e.g. an email, instant message, micro-blog update, or system message such as "download complete." The messages may be organized and prioritized to conserve limited visual space in the system's visual output device, e.g. a monitor as output device 335. FIG. 8A may illustrate an embodiment of the quick-view slide-out application presenting a prioritization of messages, combined from the several individual applications 315. The user may be able to adjust these logic rules in the user settings 320. Users may indicate priorities of messages, or disable certain messages (e.g., download complete messages).

Further, the Application Resource Manager Module 300 may execute on a processor, e.g. an electronic hardware processor, and include execution scheduling logic 350. The application resource manager 300 may use a mix of default, hardcoded, and user settings to schedule and prioritize executable tasks on a shared resource processor, such that the several individual applications 315 may be optimized according to user preferences. The application resource manager module 300 may execute on a general purpose processor that may include pipeline optimization and other execution scheduling optimizations. The execution scheduling logic/queue 350 may operate on a higher level, prioritizing the several individual applications 315 according to user preferences, and interface with any built in general purpose processor scheduler for low level optimizations. Alternatively, example embodiments may improve or replace any hardware optimizers and perform execution scheduling and optimization at all levels.

In addition to being fully customizable by user preference, default prioritizations may follow a formula. The formula may also be customizable by the user and/or developers, and different implementations of example embodiments may use different formulas. The formula may be based on one or more factors. Each factor may be referred to as a component score, and the formula result may provide a prioritization based on these component scores (e.g., a prioritization score). One example formula may be provided in the illustrative context of a download queue (e.g., 310), and the same or similar prioritization formula may be applied to an execution scheduler, a message prioritization scheme, or any other system resource prioritize. For example, the formula may be a summation function of several component scores, including for example, an application score (e.g., associated with the originating application), a request score (e.g., assigned by the application to all requests coming from the application), a context score (e.g., time of day, current activity level of the computer, etc.), a user specification score (e.g., user indicated a desire for immediate downloading of a particular request), and any other component score. The sum of these may yield a final prioritization score, and the download queue may be organized by prioritization score. This is just one example embodiment, a prioritization could be based on any number of formula functions, any number of component factors, or any number of other priority schemes.

As mentioned, download prioritization (e.g., the prioritization score) may be based on an application score, where each individual application is given an initial priority score, which may be associated with downloads originating from that application. For example, business applications may have a higher priority score than entertainment applications. The user may be allowed to modify the application score associated with one or more individual applications. Each individual application may also assign a request score to each download request. The central prioritization formula may then allow for a mix of prioritizations among the individual applications. For example, in one embodiment, requests from a higher priority application may download according to the request level prioritization, and requests from a lower priority application may download only when no further requests exist from the higher priority application. Another embodiment may allow for high priority requests from a low priority application to download before low priority requests of a high priority application or low/medium priority requests of a medium priority application.

Additionally, request types may have an associated score, such that software updates may have a greater priority than file downloads, but a lower priority than business related requests. Additionally, prioritizations may be adjusted based on context, e.g., time of day. For example, a business related request (e.g., a request from a business application) may have a higher context score between 9 a.m. and 5 p.m. In this way, business requests may take priority during working hours, and other tasks (e.g., software updates) may take priority during other time periods. Preferred download time slots may be associated with other request types, and each individual application may have a default preferred time slot. These time slots may overlap, as the context score (e.g., time) may be one of many scores used to prioritize the various requests.

Each prioritization feature may be fully customizable to the user, or may be locked by the developer. Example customization options may include the ability to adjust an application score associated with an individual application. The user may be able to customize the maximum number of simultaneous downloads (e.g., one at a time or up to four at a time). The user may be able to customize the maximum bandwidth usage, e.g., the total upload rate and/or total download rate. Additionally, the user may be able to adjust the bandwidth usage for individual requests, for individual request types, or for individual applications. For example, a user may be able to specify a total download bandwidth of a thousand kilobytes a second, with the requests of any single application consuming less than twenty kilobytes a second, with no single request consuming more than ten kilobytes a second, except for a particular application and/or a particular request type, which may have different particular limits set by the user. The user may also be provided control functions for the queue, such as the ability to pause a download (whether in progress or not), pause all downloads, resume a download, or resume all downloads. The user may also be able to rearrange the queue, which may adjust a user priority score, as one of several scores used to organize the prioritization queue (e.g., as discussed above).

Figure 4:
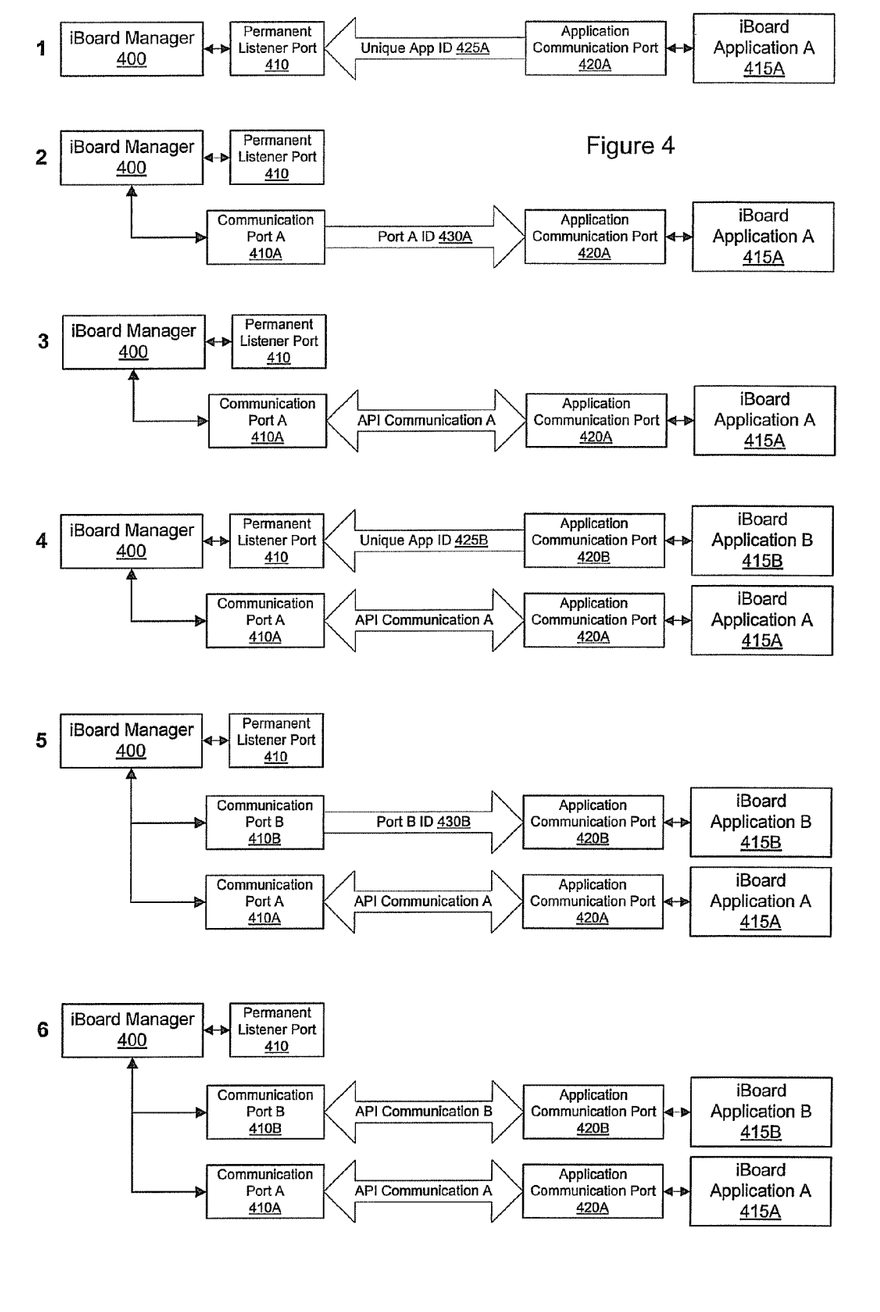
FIG. 4 depicts an example of how the application/manager connection process occurs in one example embodiment of the present invention.

The application resource manager module 300 may include an Application Programming Interface (API) 305, which may be used to interface with the several individual applications 315A to 315N. This interface will be discussed further with regard to FIG. 4. Associated with the several individual applications 315, may be an application plug-in set 340. The application resource manager may have a plug-in from each of the individual applications associated with it. These plug-ins may be installed in the application resource manager system when the associated individual application is first connected to the application resource manager, e.g., as illustrated in FIG. 4. The plug-in may enable any number of advantageous features, and may provide the application resource manager 300 with a subset of the features associated with the individual application. For example, many of the individual applications 315 may require processing after a download completes. For example, many mp3 vendors require a digital watermark to be added to the mp3 to determine the origin of the file. This processing would normally occur in the calling application. However, since the application resource manager may continue to run in the background, facilitating the queued downloads, a download may complete after the calling application has already been shut down. In this case, the application resource manager, using the associated plug-in, may perform the necessary post-download processing for the calling application. In some example embodiments of the present invention, this feature may be critical for both technological and non-technological reasons. For example, distribution rights given by original content owners to a distribution service, may require immediate processing of certain content, and may not allow that content to reside on the system in native form while waiting for the calling application to be restarted. Thus, in addition to providing a greater amount of flexibility and optimization, the associated plug-ins may afford additional compliance strategies for application developers.

FIG. 4 illustrates the initial inter-process communication (IPC) between the application resource manager 400 and individual applications 415. The application resource manager may include a permanent listening port 410, which may be the same for every application resource manager, e.g., the manager of a first system and the manager of a second, independent system. This port may remain open while the application resource manager is running, continuously listening for new connections. Each individual application may be pre-programmed with this known and universal listening port. In the example embodiment of the present invention, each system has only one application resource manager; thus there is no potential for conflict and the listener port may have a universally known address. In other embodiments, the listening port may be optionally set by the user.

When a new individual application is installed, a unique ID associated with the application may be transmitted to the application resource manager listener port 410 (e.g., as illustrated in step 1 of FIG. 4). The unique application ID 425A may contain the address of the communication port of the sending application (e.g., 420A). Upon receiving the unique ID 425A with the address of the application communication port 420A, the application resource manager 400 may generate a new, dedicated communication port 410A, for the new individual application. The application resource manager, using the unique ID 425A, may return the address of the newly created communication port, e.g., 430A. At this point, the application resource manager knows the address of the connecting application communication port 420A, and the individual application 415A knows the address of the port that was created and dedicated to that application 410A. IPC may now proceed between the APIs of the two programs, e.g., as illustrated in step 3.

As mentioned, the "permanent" listener port 410 is continually listening for new connections. Step 4 illustrates a second individual application 415B coming online, and sending its unique application ID 425B to the listener port 410. The application resource manager may create a new communication port 410B, and send the ID for that port 430B back to the second application communication port 410B. During the establishment of the second connection, the first application, having been moved to a dedicated communication port, may continue API communication with the application resource manager. In step 6, both installed individual applications are operating and communicating with the application resource manager, and the example procedure may continue the process for newly identified applications.

Figure 5:
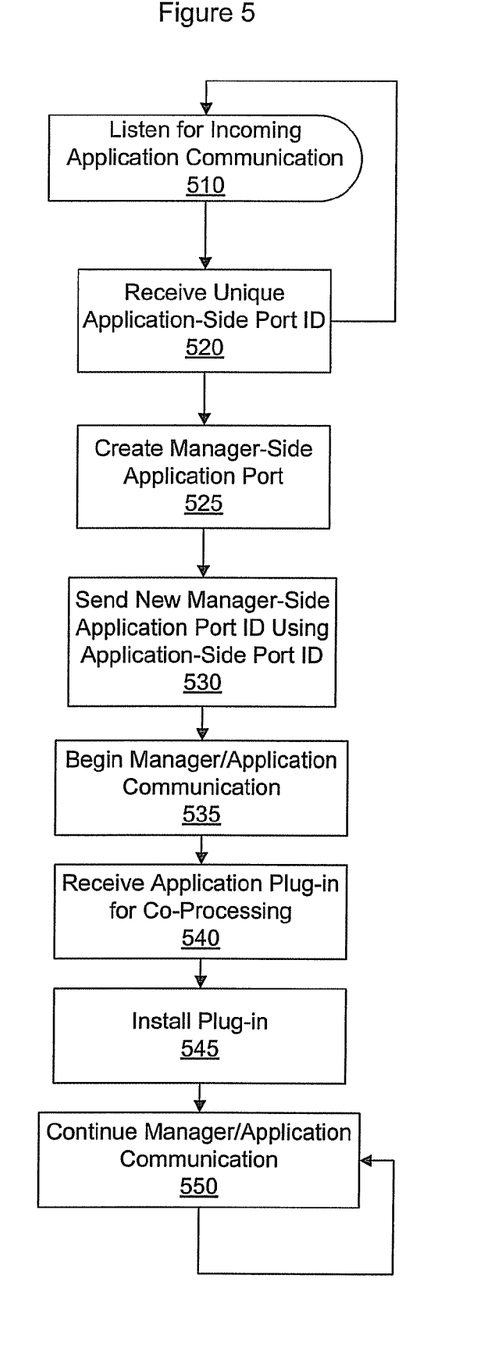
FIG. 5 depicts an example procedure of connecting/initializing a new application, according to an example embodiment of the present invention.

FIG. 5 illustrates an example procedure according to an example embodiment of the present invention. At 510 the example procedure may wait for a new incoming application communication. Once received, the example procedure may return to listening for more incoming connections at 510, while also progressing to establish a link with the first application. At 525, the application resource manager may create a new manager-side application port dedicated to the connecting application. At 530, the application resource manager may send the new manager-side application port ID using the previously received application-side port ID. At 535, the example procedure may begin ongoing communication between the application resource manager and individual application. One of the first communications with a newly established application may be to receive a plug-in from the application. As previously discussed, the plug-in may contain a subset of application features. Specifically, the subset may include, for example, essential post-download processing operations that may perform required or performance optimization functions in the event the application is no longer online. In one embodiment, in the event that the application is still online when the download completes, the individual application may perform the post download processing itself. At 545, the application resource manager may install the plug-in. The initial connecting session may include any number of other initializing tasks, but once complete, at 550, the example procedure may begin continuous communication between the application resource manager and connected application, as needed.

Figure 6:
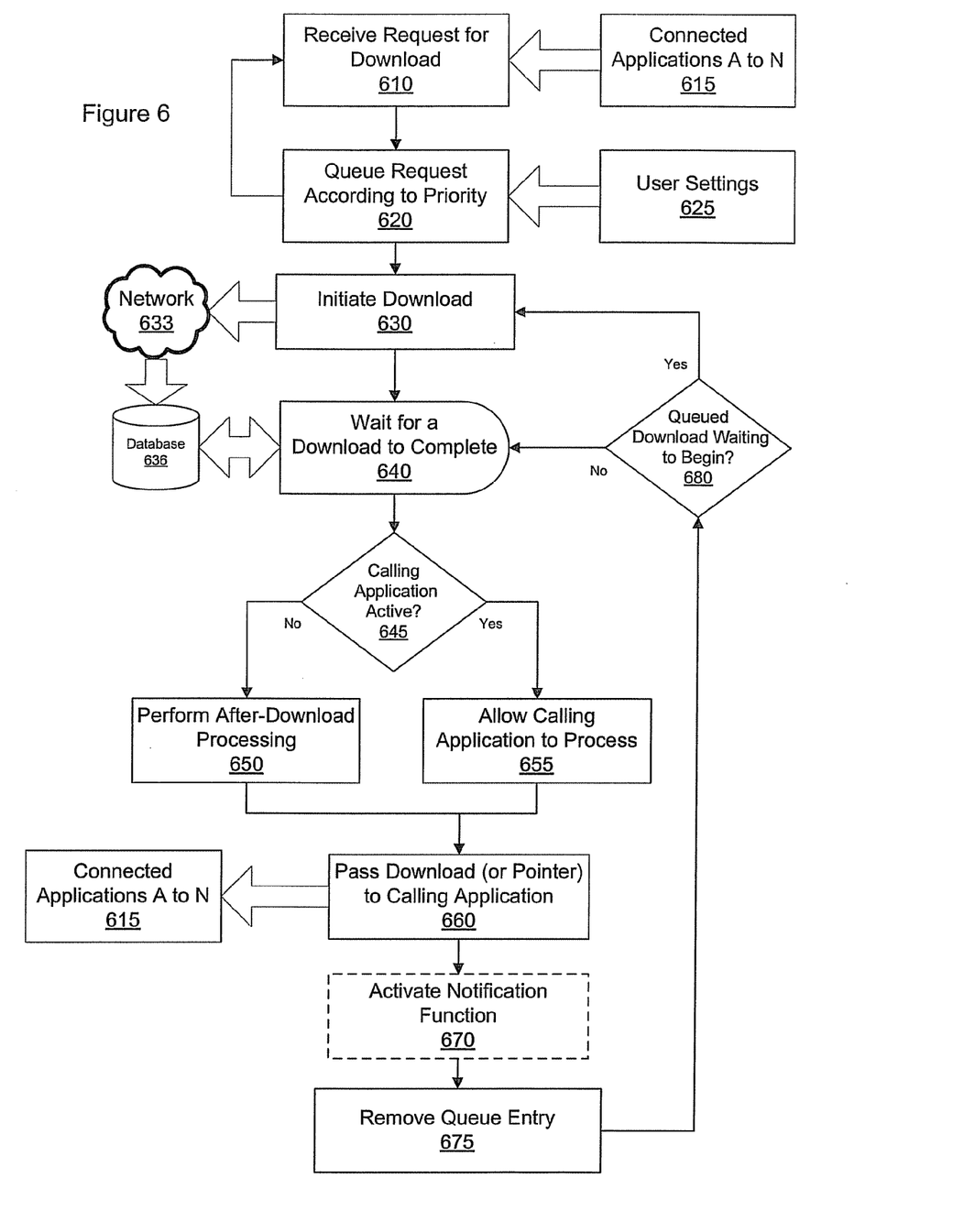
FIG. 6 depicts an example procedure of receiving, queuing, facilitating, processing, and prioritizing transfer requests, according to an example embodiment of the present invention.

Another example procedure according to an example embodiment of the present invention is illustrated in FIG. 6. In this example procedure, individual applications A to N 615 have already been connected and installed, e.g., as illustrated in FIGS. 4 and 5. At 610, the application resource manager may receive a download request from a connected application via the associated application port. The application resource manager may queue the request according to the implemented priority scheme at 620, which may call upon user settings 625 to determine prioritization. The application resource manager program may continue this aspect of the procedure, receiving and queuing download requests. Concurrently with the receiving/queuing operations, at 630, when there are download requests in the queue, the application resource manager may initiate a download from an external network 633. At 640, when the optimum number of downloads are already underway, the example procedure may wait for one of the downloads to complete. Upon completion, the download may require post-download processing. This processing is typically performed by the calling individual application, but may be performed by the previously discussed plug-in. Thus, at 645, the example procedure may check to determine if the calling application is still active. If it is, the example procedure may allow the calling application to handle the post-download processing at 655. However, if the calling application has been shut-down, at 650, the application resource manager, executing the example procedure illustrated in FIG. 6, may perform the post-download processing.

Once the post-processing has been completed, the application resource manager may pass the download or a pointer to the download to the calling application at 660. If the calling application is not online, e.g., at 650, then the completion notification is stored for delivery upon reactivation of the calling application, e.g., at 652. Step 660 may alternatively be performed prior to 655, in addition to being performed subsequent to 652. In one example embodiment, the application resource manager, via the dedicated communication link, may communicate the download information via IPC, e.g., passing a pointer to the completed download to the calling application. Optionally, or upon a download that is configured to issue an alert, at 670, the example procedure may activate a notification function, that may alert the user a download has completed. This could include any number of things, including: a system sound, a graphic message, sending an email, sending a text message, or providing an alert within the application resource manager user interface. At 675, the example procedure will remove the completed request from the download queue. Finally, the example procedure may cycle back at 680 to determine if further downloads are waiting to begin. If they are not, the example procedure may wait for any ongoing downloads to complete at 640. If there are pending downloads, the example procedure may initiate the next highest priority request in the queue, at 630.

As illustrated, example embodiments of the application resource manager may continuously connect new individual applications and install associated plug-ins received from those applications. The example embodiment may continuously receive download, update, message and/or any other request requiring data transfers with an outside network from connected applications. The example embodiment may prioritize and queue the requests, and facilitate the optimization of satisfying those prioritized requests. The example embodiment may post-process completed downloads, provide notifications, and pass the data to the requesting application for further use. Finally, the example embodiment may concurrently and continuously perform these operations, in addition to other tasks, to provide a performance optimized user experience.

Figure 7A:
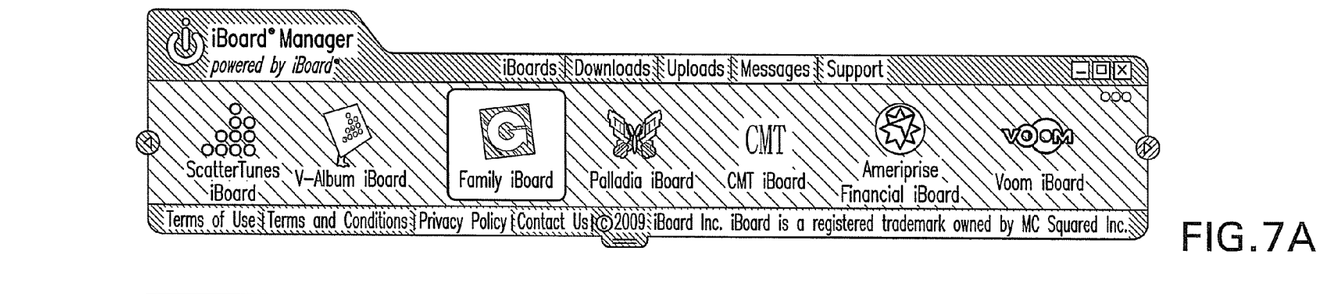
FIGS. 7A and 7B depict example graphical layouts of a user interface, according to example embodiments of the present invention.
Figure 7B:
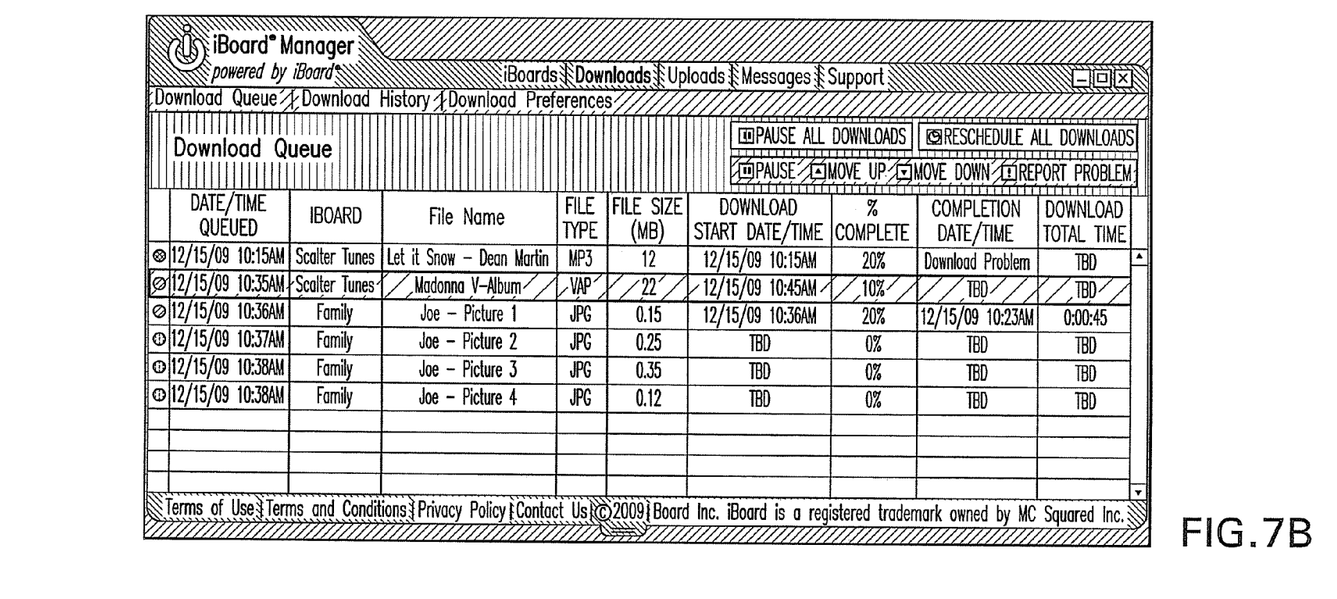

FIG. 7A illustrates an example user interface (UI) according to an example embodiment of the present invention. The example UI may have several feature sets, e.g., iBoards, downloads, uploads, messages, and support. The example display of FIG. 7A illustrates the "iBoards" feature as a collection of the installed individual applications for the user to select. A fixed number of launch icons may be visible, and this number may be customizable in user settings. Further, navigation buttons may be present for rotating the set of launch icons that are visible and available for selection. As was previously discussed, each of these applications may call for data from an outside network (e.g., the Internet), and the prioritized and optimized queue of downloads for each application may be viewed under the "download" feature. An example of this view is illustrated in FIG. 7B. Relevant information may be presented about each download with graphics and/or text. For example, date/time queued, calling application, file name, file type, file size, download start, percent complete, estimated completion time, currently elapsed download time, total download time for finished items, prioritization level, command links to change prioritization levels, an explanation of why an entry has a certain priority, and any other relevant information or function link. The upload interface may be similar to the download interface, but with traffic in the opposite direction. Some applications may be upload intensive, such as system back up applications, photo sharing and online album applications, etc. Additionally, since most consumer Internet connections have an upload bandwidth that is significantly more restrictive than the download bandwidth of the same connection, mere messages, simple attachments, and update requests may cause a backlog of uploads requiring optimization.

Figure 8B:
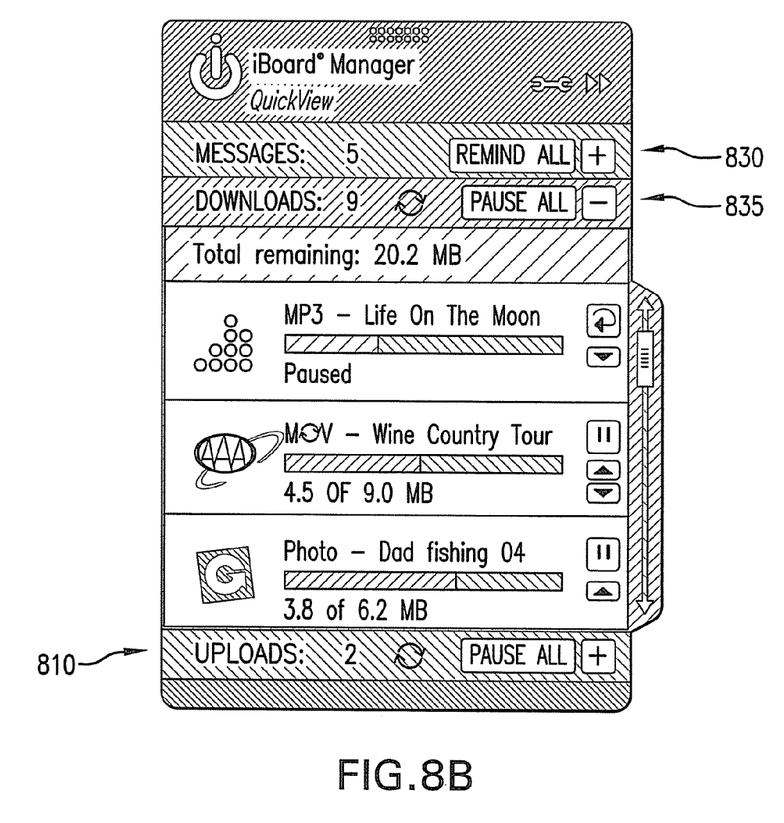

The download and upload functions may also contain global functions, such as "pause all downloads," "pause all uploads," or "pause all transfers." Additionally, global functions such as rescheduling, resuming, canceling, deleting, or reprioritizing the uploads, downloads, or transfers may be provided as user functions. Additionally, a subset of these functions may be provided in a smaller "pop out" UI. This smaller control interface may be designed to be less intrusive on the output display area, to more readily be used in conjunction with other applications on the device. One example embodiment of this smaller interface is illustrated in FIG. 8A and FIG. 8B. This example embodiment uses a "stack" of key features and functions. FIG. 8A illustrates an example expansion of the "Downloads" function, while FIG. 8B illustrates an example expansion of the "Messages" function. For example, at 810, the total number of current uploads is displayed with the function to "pause all" or expand this collapsed section to display more information, e.g., an itemized list of the uploads. Element 830 shows an expanded section. This section shows the pending messages with the functions of "remind all" and a "-" to collapse the section. Within the expanded section 830, a set of new messages for each active individual application is listed. In this example embodiment, collapsed and expanded sections are illustrated, but even the expanded sections are still a subset of the larger interfaces illustrated in FIGS. 7A and 7B. For example, the "Virtual Album iBoard" element 835, shows only one new message at a time, with navigation arrows to move to other new messages. This is only one illustrative example, and other implementations may include more or less information in the expanded view. The messages may also include function links, e.g., discard the message, send a reminder, and collapse the subsection.

The amount of information displayed on the smaller interface may be customized by user settings. For example, when a new download completes, the smaller interface may temporarily expand to display the message section for that application. Alternatively, the smaller interface may expand the entire message section, or just the specific message. The expansion may last until the user acknowledges the message, may collapse after a fixed period of time, or may collapse after a fixed period of time in which a condition occurs (e.g., input device activity to indicate the user is actively using the system). Alternatively, these features may be turned off, and expansion may only occur upon express user command, or such an arrangement may be set for certain types of messages (e.g., file completion), but not other types of messages (e.g., email). Further, messages on the smaller interface may include other functions within the messages, e.g., a download complete notification may include a function link to launch the individual application that originally requested the download.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

What is claimed is:

1. A computer implemented method for managing computer applications, the method comprising performing, on a computer, the steps of:

receiving from a first computer application executing on the computer a first download request, the first download request being based on user input received by the first computer application;

receiving from a second computer application executing on the computer a second download request, the second download request being based on user input received by the second computer application, wherein the first and the second computer applications are independent of each other, and wherein the first and second applications can be independently shut down and independently run;

prioritizing the first download request and the second download request;

downloading data associated with the download requests from a network, according to the prioritization;

upon completion of a data download from the network, determining if whichever application that requested the download is running, and if running passing information regarding the downloaded data to said whichever application for application-specific post download processing, and if the said whichever application is not running, performing said application-specific post download processing;

upon completion of a data download from the network, removing the completed download from the prioritization, and for all remaining data download requests: downloading data associated with the remaining data download requests, according to the prioritization.

2. The method of claim 1, wherein the receiving, prioritizing, determining, and passing are performed for at least a third application and third download request.

3. The method of claim 1, wherein the prioritization is based upon input received from a user.

4. The method of claim 1, further comprising recording performance metrics of the computer implemented method for managing computer applications.

5. The method of claim 1, further comprising receiving application updates from an update server and passing the updates along to whichever application of a plurality of applications indicated by a particular update.

6. The method of claim 5, wherein a particular received application update was requested after receiving a message from a particular application requesting the particular update.

7. The method of claim 1, further comprising receiving from a plurality of applications, a plug-in, configured to perform a sub-set of functions associated with a particular application that provided the plug-in.

8. The method of claim 7, wherein for each of the plurality of applications, the sub-set of functions associated with said particular application is said application-specific post download processing for said particular application, and further comprising, upon completion of a download, modifying the download based on functions defined by the plug-in provided by an application that requested the completed download.

9. The method of claim 1, wherein the method includes providing a user interface to control aspects of a computer system upon which the method executes, the method further comprising:

minimizing the user interface; and providing a reduced user interface including at least the following functions:

functions to pause all uploads, downloads, or both, functions to display at least part of a newly received notification.

10. The method of claim 1, wherein the prioritizing is based on a priority score derived from a combination of default settings, stored user settings, and other user input, including at least one of: an origination application, a request type, and a request context.

11. A device for managing computer applications, comprising:

a computer including an application management module configured to:

receive from a first computer application executing on the computer a first download request, the first download request being based on user input received by the first computer application;

receive from a second computer application executing on the computer a second download request, the second download request being based on user input received by the second computer application, wherein the first and the second computer applications are independent of each other, and wherein the first and second applications can be independently shut down and independently run;

prioritize the first download request and the second download request;

download data associated with the download requests, according to the prioritization;

upon completion of a data download, determine if whichever application that requested the download is running, and if running, pass information regarding the downloaded data to said whichever application for application-specific post download processing, and if the said whichever application is not running, perform said application-specific post download processing;

upon completion of a data download, remove the completed download from the prioritization, and for all remaining data download requests: downloading data associated with the remaining data download requests, according to the prioritization.

12. The device of claim 11, wherein the receiving and passing are performed between the application management module and at least a third application and third download request.

13. The device of claim 11, wherein the prioritization is based on a priority score comprising a plurality of factors, including default settings, user settings and other user input.

14. The device of claim 11, wherein performance metrics of the application management module are recorded by the application management module.

15. The device of claim 11, wherein the application management module is configured to receive application updates from an update server; wherein the application management module is configured to pass the updates along to whichever application of a plurality of applications indicated by a particular update.

16. The device of claim 15, wherein the application management module requested a particular received application update, after receiving a message from a particular application, requesting the particular update.

17. The device of claim 11, wherein the application management module is configured to receive from each of a plurality of applications, a plug-in configured to perform a sub-set of functions associated with a particular application that provided the plug-in to the application management module.

18. The device of claim 17, wherein the application management module is configured to modify, upon completion of a download, the download based on functions defined by the plug-in provided by an application that requested the completed download.

19. The device of claim 11, wherein the application manager module is configured to present a user interface on a computer system, the application manager module further configured to:

minimize the user interface; and provide a reduced user interface including at least the following functions:

functions to pause all uploads, downloads, or both, functions to display at least part of a newly received notification.

20. The method of claim 1 further comprising
continually listening, via a permanent listening port, for connection requests from a plurality of additional independent computer applications;
automatically generating, for each connection request received from one of the plurality of additional applications, a dedicated communication port for said one of the plurality additional applications, said one of the plurality of additional applications executing on the computer; and
wherein the receiving, prioritizing, determining, and passing are performed for at least said one of the plurality of additional applications and an associated download request.

* * * * *